Patented Aug. 16, 1927.

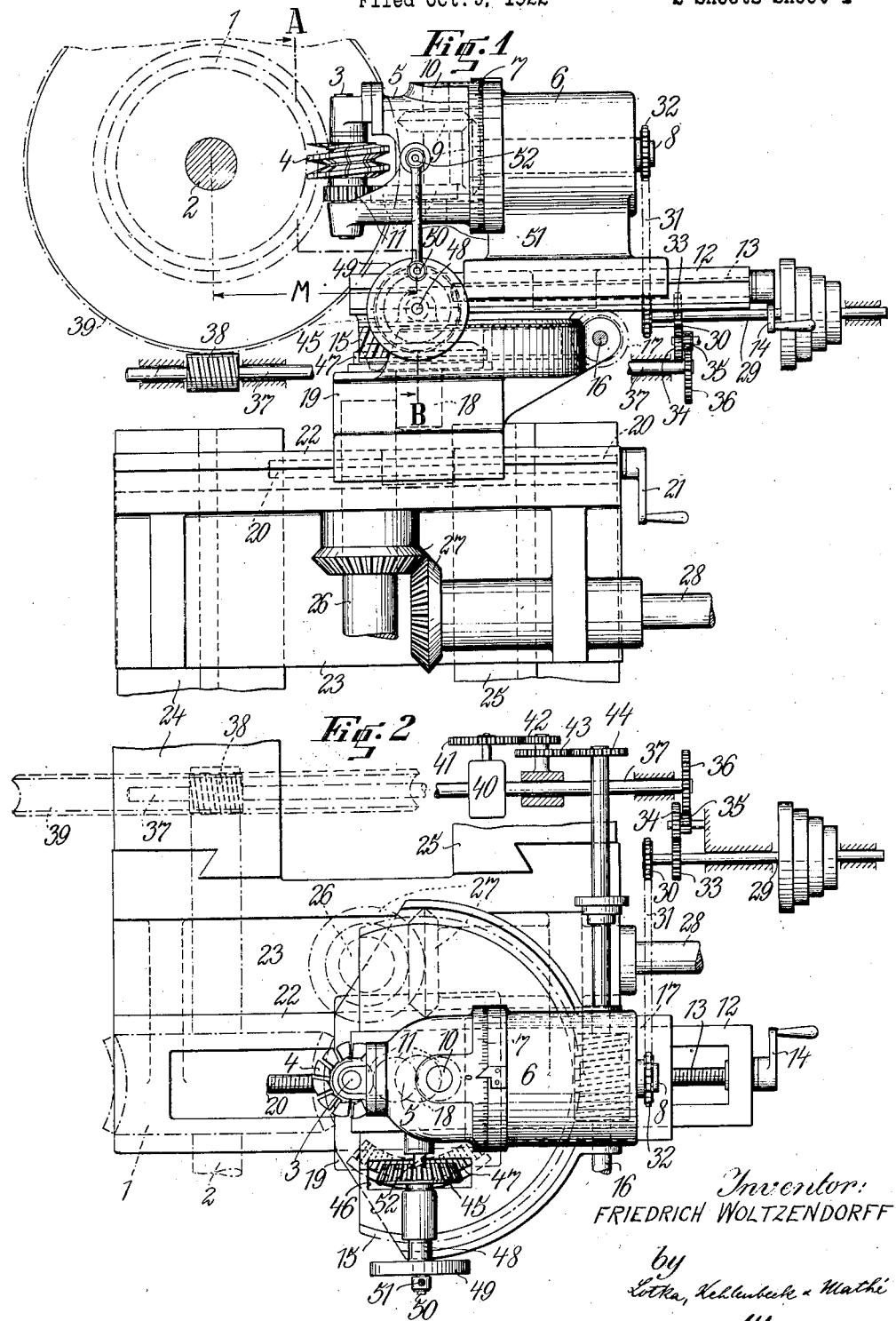

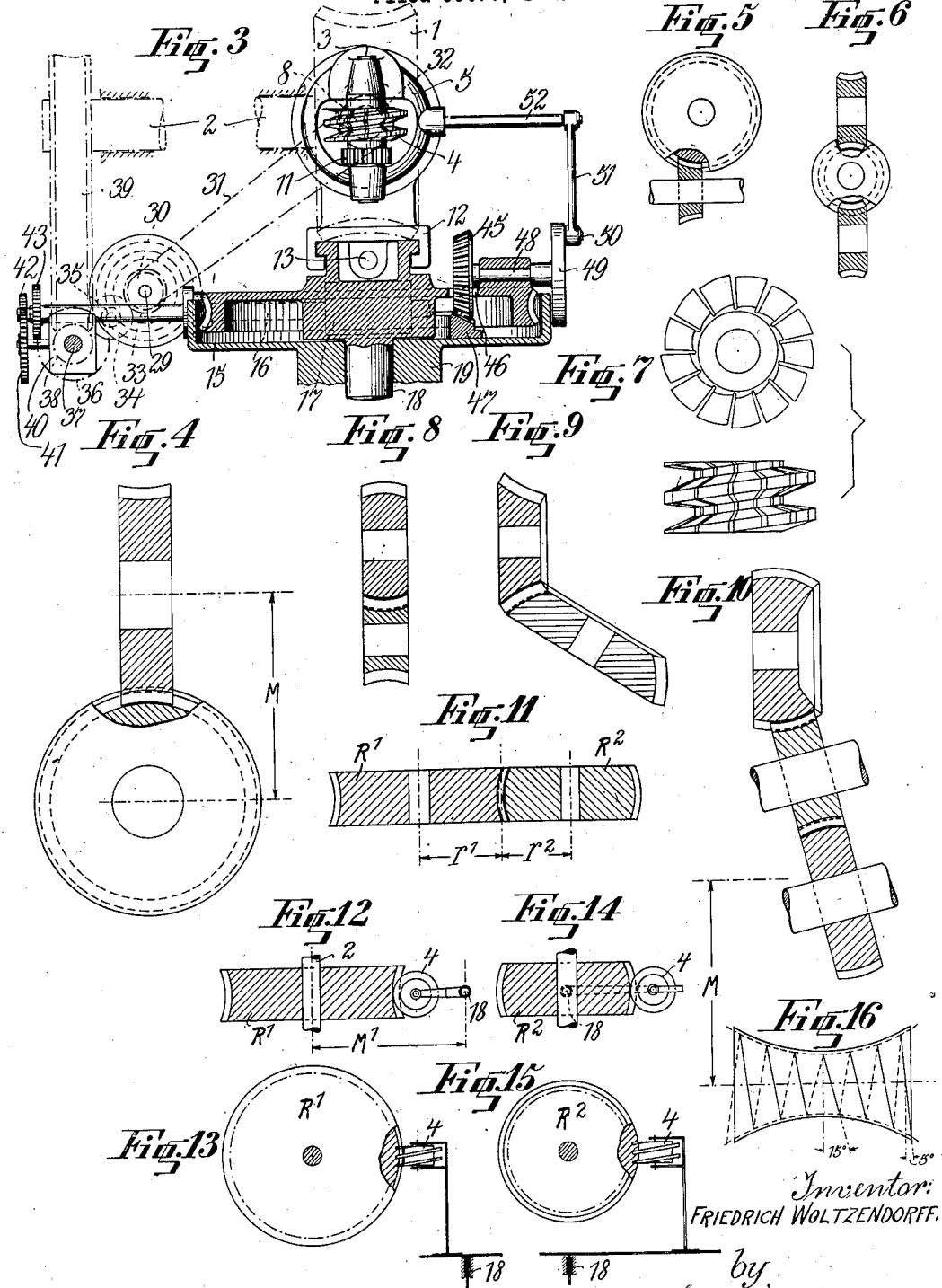

1,639,624

UNITED STATES PATENT OFFICE.

FRIEDRICH WOLTZENDORFF, OF BERLIN, GERMANY.

MACHINE FOR CUTTING GEARS.

Application filed October 5, 1922, Serial No. 592,479, and in Germany October 7, 1921.

My invention relates to a method of, machines and cutters for cutting concave and convex gears, and more particularly globoid gears, of a great variety of types. My improved method consists in rotating the cutter bodily about an axis during operation which is at right angles to the axis of the gear blank and may be at the same level as the axis of said blank, or at a distance therefrom which is determined in accordance with the centres of the gears or the modulas. I move the cutter transversely in relation to said blank and obtain a concave or convex gear by disposing the cutter between the axis of the blank and the axis about which said cutter is rotated bodily, or beyond said two axes.

Where a helicoidal cutter is employed, I impart rotation to the blank which rotation is in definite relation to the rotation of the cutter about its own axis and its rotation about said axis about which it is rotating bodily.

When cutting globoid gears or worms, the cutter is guided in such a manner that its position in relation to the surface to be cut is adjusted in accordance with the variation of the helix angle of said gear or worm. Otherwise, that is, with the cutter fixed at an invariable helix angle, distorted teeth would be obtained in gears of this type.

In the drawings affixed to this specification, means for performing my novel method are illustrated by way of example.

In the drawings

Figs. 1 and 2 are an elevation and plan view, respectively, of a gear cutting machine designed in accordance with my invention, Fig. 3 is a section on line 3—3 of Fig. 1, Figs. 4 to 6 illustrate several gears to be cut on said machine, Fig. 7 is an elevation and front end view of a special cutter, Figs. 8 to 10 illustrate some further gears to be cut on said machine, Figs. 11 to 15 illustrate diagrammatically the cutting of a pair of concave-convex gears, Fig. 16 is a diagrammatic illustration of a globoid worm to be cut.

Referring now to Figs. 1 and 2, the blank 1 is secured on a horizontal arbor 2 which constitutes a rotatable blank carrier. The arbor 3 of the cutter 4 is supported in a rotatable cutter bracket 5 which is rotatably carried in a bracket carrier or bearing 6 and adapted to be indexed thereon by means of a graduation 7. The driving spindle 8 is carried in said bracket carrier or bearing 6 and imparts rotation to the arbor 3 of the cutter 4 by means of a spindle 10, bevel gears 9 and spur gears 11. The bracket carrier or bearing 6 is adapted to be moved along a slideway or guide 12 by means of a screw 13 and crank 14. Secured to said guide 12 is a worm gear segment 15, to which motion is imparted by a worm 17 on a spindle 16, said segment and its associated elements constituting a cutter carrier mounted for rotatable adjustment about an axis 18 at right angles to the axes of rotation of the blank carrier 2 and said cutter bracket 5.

An auxiliary slide 12 is adapted to rotate with said cutter carrier 15 about said axis which is shown as a vertical pivot 18. This pivot is carried in a secondary slide 19 which comprises part of the cutter carrier and is adapted to be displaced on guides 22 by means of screw 20 and crank 21. The guide 22 is arranged on slide rest 23 which constitutes a main slide and is adapted to move along vertical prismatic guides 24, 25 of the machine frame and is adapted to be displaced by means of a screw 26 which is rotated by a spindle 28 through the medium of bevel gearing 27.

The spindles 2, 8, 16, and, if desired, 28, are positively connected so that the parts secured to or driven by, said spindles, are actuated in a predetermined relation to each other which may be adjusted. This relation is determined by the number of teeth of the blank and, if required, by its pitch.

In the present instance, motion is imparted to the spindle 8 which causes the cutter to rotate about its own axis, by means of a sprocket 30 on the driving shaft 29, a chain 31 and a sprocket 32 on the spindle 8. From the same shaft, a worm 38 meshing with a gear 39 on the arbor or rotatable blank carrier 2 on which the blank is mounted, is actuated by a train of gears 33, 34, 35 and 36 and a shaft 37. The latter is operatively connected with differential gearing 40 from which a shaft 16 adapted to rotate the cutter carrier 15 and with it the cutter 4 bodily about the pivot 18, is actuated by means of a train of gears 41, 42, 43 and 44.

On the machine described, globoid gears of various types as well as helical gears, spur gears and bevel gears, having convex or concave teeth, may be cut.

In order to cut one of the gears of the globoid drive illustrated in Fig. 4, a blank is mounted on the arbor or blank carrier 2 and the distance M between the arbor 2 and the pivot 18 is made exactly equal to the distance between the centres of the drive by means of the crank 21. It will be understood that as the crank 21 is operated to actuate the screw 20, the secondary slide 19 and with it the cutter carrier 15 and its associated elements will be shifted to adjust the bracket carrier toward and away from the axis of the blank carrier 2. Now, the bracket 5 is so indexed by means of the graduation 7 that the inclined position of the cutter 4 is equal to the average helix angle of the teeth of the blank 1. The ratio of transmission of arbor or blank carrier 2 and spindle 8 is adjusted in accordance with the said helix angle. The bearing or bracket carrier 6 is now moved toward the blank until the outer circumference of the cutter touches that of the blank. The cutter is now displaced laterally by swinging the cutter carrier 15 and with it the auxiliary slide 12, upon the pivot 18 after which the cutter is fed forward for the tooth length. The gears for imparting the automatic movement of the parts are now placed in operation. In operation, the cutter is rotated about its own axis and at the same time is rotated bodily about the pivot 18 by means of the shaft 16 and the worm gear 15, 17. This movement of the cutter causes the gear to become concave, as shown in Fig. 2.

For cutting the mating gear, the distance M remains unaltered. When the mating gear is of smaller diameter than the first gear, the bearing or bracket carrier 6 with the cutter 4 is moved further to the left in Fig. 1 by means of the crank 14; when it is of greater diameter, the bearing or bracket carrier 6 is moved to the right. In this manner, I obtain a correct tooth outline for both globoid gears, as the cutter when cutting the first gear is rotated bodily in an arc of a circle whose radius is exactly equal to that of the mating gear and both gears are generated under exactly the same conditions under which they are to operate. It is of the utmost importance that the helical angles of the gear and mating gear, which are not identical in both, are generated automatically so that a calculation of said angles—which is difficult, as those skilled in the art know—may be dispensed with. The pitch diameter $Dt$ of helical gears was heretofore calculated by the formula: $zMst = Dt$, where $z$ is the number of teeth and $Mst$ the modulus of frontal pitch. Globoid gears are also calculated by this formula. In helical gears, the length of the helix had to be found and change gears determined by it, which practically never were in accordance with said length, so that differences of helix angles occurred in meshing helical gears. Such differences were not of considerable influence here, as helical gears at right angles are in contact at a single point only. But conditions are different in globoid gears where the rim of one gear hugs that of the other, for here the smallest difference in helix angle would prevent correct meshing of the gears. However, in my improved method, the length of the helix need not be calculated but is automatically generated by the machine in accordance with the ratio of the drive and the pitch diameters of the two gears. Therefore, the helix angles must of necessity be identical. Besides, it is not necessary to employ cutters of different sizes for the several gears but the gear and its mate are cut by the same cutter which is a further and very material advantage of my improved method.

The concave globoid drive is a normal drive with axes at right angles. However, on the machine described gears having parallel axes and, broadly, all drives may be cut the axes of which are at any angle from 0 to 90 degrees. In the latter case, the mating gear is not generated in the sense of a mating gear but its pitch diameter is greater or smaller. The angle between the axes of the two gears is not 90 degrees but more or less.

In Fig. 5, a globoid gear drive is illustrated where the mating gear is engaged by the other gear at a point which is not in the central plane of said mating gear. Gears of this configuration are well adapted for practical use, but could heretofore not be cut with perfect teeth. In my improved machine, I obtain perfect teeth by the very simple expedient of raising or lowering the slide rest or main slide 23 in relation to the arbor 2 by operating the screw 26 causing the spindle 8 to be displaced accordingly.

In the drive illustrated in Fig. 6, two gears cooperate with a globoid worm. Gears having few teeth, say, one to twelve, may be referred to as "globoid worms." In such a case, as illustrated in Fig. 6, three worms are combined to cooperate, one of which has one tooth while the other may have two or three teeth. The worm having the smallest helix angle is the driving one. Worms cut in accordance with my invention as well as gears cut in accordance therewith, have a very wide range of contact and are able to transmit considerably greater forces than cylindrical worms.

For the cutting of globoid, concave and convex gears, the cutter, when of small diameter, should have a length not exceeding twice the pitch, but may be shorter, because in this case it may perform enough work while moving transversely through the rim of the gear. For cutting concave worms, the cutter should not be longer than the pitch of the gear to be cut, as shown in Fig. 7, while its diameter is considerable. By these means, very concave worms of steep helical angle can be cut so as to obtain perfect meshing.

The drive illustrated in Fig. 8 comprises a concave and a convex spur gear. The principal advantage of such a gear is the fact that the teeth slide within each other during rotation, so that a perfectly noiseless motion is obtained. Further, owing to the concave and convex form of the rims the line of contact of the teeth is lengthened so that the gears are able to transmit more power than are cylindrical spur gears of the same diameters as the gears shown in Fig. 8. Besides, lateral displacement of such gears is impossible so that screws for holding them, washers etc., may be dispensed with.

Figs. 9 and 10 illustrate gears comprising concave and convex gears the axes of which are at an angle. The bevel gears illustrated in Fig. 9 have the same advantages as the drive illustrated in Fig. 8. The bevel gears are, in distinction from the known method, cut in accordance with the inner diameter of the pitch cone. The cutter starts cutting the inner pitch diameter at the standard modulus and passes positively into the front modulus. In the drive illustrated in Fig. 10, the angle of the axes may be varied during operation, as in knuckle joint. The gears shown in Figs. 8 to 10 may also be provided with helical teeth by imparting to them in cutting a rotation in addition to their normal rotation.

The concave and also the convex gears of such drives can be cut on my improved machine as the cutter 4 will generate concave gears when it is at the left of the pivot 18, as illustrated in Fig. 1, and will generate convex ones when it is at the right of said pivot. Figs. 11 to 15 illustrate diagrammatically the cutting of the two gears $R^1$, $R^2$ of a spur gear drive. When cutting the gear $R^1$, as illustrated in Figs. 12 and 13, the cutter 4 is at the left of its pivot 18 and generates a concave gear. The distance of the pivot 18 and the arbor or blank carrier 2 on which the blank $R^1$ is mounted, is $M^1 = r^1 + r^2$. For cutting the gear $R^2$, as illustrated in Figs. 14 and 15, the slide 19 is moved to the left until the pivot 18 is vertically below the arbor or blank carrier 2, the slide 12 and the parts 5 and 6 mounted thereon having previously been withdrawn. The cutter is now at the right of the pivot 18 and will generate the convex gear $R^2$.

When spur gears are to be used as change wheels, the distance M of the axes of arbor or blank carrier 2 and pivot 18 should be a direct function of the modulus so that the several sets of wheels will cooperate properly notwithstanding their different radii. The modulus is the same for all the wheels of a set and the distance M is found by multiplying the modulus with a factor which may be determined as desired, for instance 50, 30 or 60.

On my improved machine, I may, as explained, cut concave and convex gears of all the types referred to and of any other types with the same simple cutter. This, and more particularly the simple design of the cutter, is particularly important because it reduces the very high initial costs of machines and cutters. For cutting gears having teeth parallel to their axis, and particularly segment gears, ordinary side milling cutters and even planing tools may be employed which are pivoted about 18. However, the best method is in this case that of using a cutter and rotating the blank at the same time.

All the gears cut in accordance with my invention mesh perfectly, the range of contact being much greater than in gears cut as heretofore. Consequently, the gears cut in accordance with my invention are able to transmit much higher powers than other gears.

The position of the blank 1 and cutter 4 may also be reversed, that is, the blank may be horizontal and the cutter 4 may be rotated bodily about a horizontal pivot. It is also possible to rotate the blank bodily about the tool, and also, to impart to the blank or the cutter, or both, an additional movement in a vertical direction.

When cutting globoid gears or globoid worms, an additional movement must be imparted to the cutter in order to prevent distortion of the tooth outlines toward the front ends. In the globoid worm illustrated diagrammatically in Fig. 16, the helix angle is 15 degrees at the centre of the worm and 5 degrees at the front ends, making a difference of 10 degrees from the centre to the front ends. If the cutter were formed in accordance with one of these helix angles and were only rotated about its own axis and pivoted about the axis 18, the tooth outlines would be so distorted that the teeth would not mesh properly in those portions where the helix angle of the worm to be cut is different from the angle of the cutter.

According to my invention the cutter bracket 5 in which the cutter 4 is carried, is rotated about its axis during the rotation of the cutter about the pivot 18, so that the cutter is adjusted to the position corresponding to the helix angle of the particular worm portion it is cutting at the moment. With this object in view, I provide on the cutter carrier or segment 15 a bearing for the shaft 48 of a bevel gear 45, as shown in Fig. 3. The bevel gear is arranged in an opening 46 of said segment 15 and meshes with a bevel segment 47 which is mounted on the secondary slide 19. On the shaft of the bevel gear 45 there is mounted a crank disc 49 to the crank pin 50 of which is linked a connecting rod 51. The other end of the said rod engages a rod 52 which is secured to the cutter bracket 5 on the bearing or bracket carrier 6. When the cutter carrier or segment 15 is rotated the bevel gear 45 will roll on the bevel segment 47 and the disc 49 will be rotated accordingly, so that the crank pin 50 will be moved downwards from the position illustrated in Fig. 3. The ratio of the mechanism is such that by rotating the cutter bracket 5 positively as described, the cutter 4 is so adjusted while moving about the pivot 18 that its position corresponds to the helix angle of the worm at the portion being cut. The face of the cutter will then always be at an angle of 90 degrees to the face of the teeth so that the teeth will mesh perfectly throughout in the drive. When it is desired to rotate the bracket in opposite direction, that is in an upward direction from the position shown in Fig. 3, the crank disc 49 is turned on the shaft 48 for 180 degrees so that the crank pin 50 is below the shaft 48 when in its central position. It will be understood that the connecting rod 51 is employed only when globoid gears or worms are to be cut, and that when gears of the types shown in Figs. 4 to 15 inclusive are being cut the connecting rod 51 is disconnected.

I claim:

1. A machine for cutting gears, comprising a rotatable blank carrier, a bracket carrier, a rotatable cutter bracket mounted to swing on said bracket carrier upon an axis at right angles to the axis of the blank carrier, a cutter carrier mounted for rotatable adjustment of said cutter bracket about an axis at right angles to the axes of rotation of said blank carrier and said cutter bracket, the bracket carrier being adapted for adjustment of said cutter bracket toward and away from the blank carrier axis.

2. A machine for cutting gears, comprising a rotatable blank carrier, a cutter carrier mounted to swing about an axis at right angles to said blank carrier's axis, a cutter bracket mounted on said cutter carrier to swing in unison with said cutter carrier and also to swing relatively to said carrier about an axis perpendicular to the axis of said cutter carrier, and a cutter journaled in said bracket for rotation about an axis perpendicular to the axis about which said bracket swings relatively to the cutter carrier.

3. A machine for cutting gears, comprising a rotatable blank carrier, a cutter carrier mounted to swing about an axis at right angles to that of the blank carrier, a slide movable on said cutter carrier toward and from the axis about which said carrier swings, a cutter bracket pivotally mounted on said slide about an axis at right angles to the axis about which said carrier swings, a cutter journaled on said bracket to rotate about an axis lying in a plane perpendicular to the axis about which said cutter bracket swings, and an operative connection for causing said cutter bracket to swing relatively to the slide as the cutter carrier swings about its axis.

4. A machine for cutting gears, comprising a rotatable blank carrier, a slide movable toward and from said blank carrier, a cutter carrier mounted to swing on said slide about an axis at right angles to the direction in which the slide moves, a cutter bracket connected with said carrier and mounted to swing about an axis at right angles to that of the cutter carrier, and a cutter journaled in said cutter bracket to turn about an axis lying in a plane perpendicular to the axis about which the said bracket swings relatively to the cutter carrier.

5. A machine for cutting gears, comprising a rotatable blank carrier, a main slide movable toward and from said carrier, a cutter carrier movable in unison with said slide and also mounted to swing relatively thereto about an axis parallel with the path of said slide, an auxiliary slide mounted on said carrier and movable toward and from the axis of such cutter carrier, a cutter bracket mounted to swing on said auxiliary slide about an axis parallel to the path of said slide, and a cutter journaled in said bracket to rotate about an axis lying in a plane perpendicular to the path of said slide.

6. A machine for cutting gears, comprising a rotatable blank carrier, a main slide movable toward and from said carrier, a secondary slide movable in unison with the main slide and also movable relatively to said main slide in a direction transverse to the path of said main slide, a cutter carrier mounted to swing on the secondary slide about an axis parallel to the path of the main slide, an auxiliary slide mounted to move in unison with said cutter carrier and also movable relatively to such carrier toward and from the axis thereof, a cutter bracket mounted to swing on said auxiliary slide about an axis parallel to the path of said auxiliary slide, and a cutter journaled in said bracket to rotate about an axis lying in a plane perpendicular to the path of said auxiliary slide.

7. A machine for cutting gears, comprising a rotatable blank carrier, a cutter carrier mounted to swing about an axis at right angles to that of the blank carrier, a cutter mounted to turn about an axis which lies in a plane parallel to the axis of the cutter carrier, and sliding means for altering the relative position of said axes so that the plane containing the cutter axis may be brought to a position between the axes of the blank carrier and of the cutter carrier, or to a position in which the axis of the cutter carrier lies between the axis of the blank carrier and the plane containing the cutter axis.

8. A machine for cutting gears, comprising a rotatable blank carrier, a cutter carrier mounted to swing about an axis perpendicular to that of the blank carrier, a cutter rotatable about an axis lying in a plane parallel to the axis of the cutter carrier, and slide means for shifting the relative position of the cutter carrier axis and of the plane containing the cutter axis, to bring said cutter carrier axis into said plane, or to one side or the other of said plane.

9. In a machine for cutting gears, in combination, an arbor adapted to support a blank, a cutter, means for rotating said cutter, a slide supporting said cutter and adapted to be rotated bodily about a pivot at right angles to said arbor.

10. In a machine for cutting gears, in combination, an arbor adapted to support a blank, a cutter, means for rotating said cutter, a slide supporting said cutter and adapted to be rotated bodily about a pivot at right angles to said arbor, and means for displacing said slide along said pivot and in relation to said blank arbor.

11. In a machine for cutting gears, in combination, an arbor adapted to support a blank, a cutter, means for rotating and supporting said cutter, said supporting means being adapted to be rotated bodily about a pivot at right angles to said arbor, means for effecting said pivotal rotation and means for adjusting said cutter automatically so as to alter its position in relation to the tooth faces being cut in accordance with variations of the helix angle of said tooth faces.

12. In a machine for cutting gears, in combination, an arbor adapted to support a blank, a cutter, means for rotating said cutter, a bracket adapted to support said cutter, a bearing adapted to support said bracket and adapted to be rotated bodily about a pivot at right angles to said arbor, means for effecting said pivotal rotation, and means for rotating said bracket, said means being operatively connected with said means for effecting the pivotal rotation of said bearing.

In testimony whereof I hereunto affix my signature.

FRIEDRICH WOLTZENDORFF.